United States Patent
Nakamura et al.

(10) Patent No.: US 8,726,755 B2
(45) Date of Patent: May 20, 2014

(54) SHIFT DEVICE

(75) Inventors: Shuji Nakamura, Aichi-ken (JP); Hideaki Ito, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 133 days.

(21) Appl. No.: 13/276,421

(22) Filed: Oct. 19, 2011

(65) Prior Publication Data

US 2012/0096970 A1    Apr. 26, 2012

(30) Foreign Application Priority Data

Oct. 21, 2010  (JP) ................. 2010-236404

(51) Int. Cl.
*B60K 20/00*  (2006.01)
*G05G 9/00*   (2006.01)
*G05G 5/00*   (2006.01)
*F16H 59/04*  (2006.01)

(52) U.S. Cl.
USPC ............ 74/473.21; 74/473.1; 74/473.3

(58) Field of Classification Search
USPC ............. 74/473.1, 473.12, 473.21–473.26, 74/473.3, 473.33
See application file for complete search history.

(56) References Cited

U.S. PATENT DOCUMENTS

| | | | |
|---|---|---|---|
| 6,170,353 B1 * | 1/2001 | Worner et al. | 74/473.21 |
| 6,311,577 B1 * | 11/2001 | Worner et al. | 74/473.21 |
| 6,756,698 B2 | 6/2004 | Shamoto et al. | |
| 2002/0056334 A1 | 5/2002 | Fujinuma | |
| 2004/0118236 A1 * | 6/2004 | Tazai | 74/473.1 |
| 2004/0237694 A1 * | 12/2004 | Lindenschmidt et al. | 74/473.21 |
| 2005/0044979 A1 * | 3/2005 | Fort et al. | 74/473.21 |
| 2006/0016287 A1 | 1/2006 | Grossman et al. | |
| 2006/0117893 A1 * | 6/2006 | Shimizu et al. | 74/473.21 |
| 2008/0006112 A1 | 1/2008 | Mitteer | |

(Continued)

FOREIGN PATENT DOCUMENTS

| | | |
|---|---|---|
| DE | 19825479 | 3/2009 |
| JP | H0840100 | 2/1996 |
| JP | 2007-022375 | 1/2007 |

OTHER PUBLICATIONS

Japanese Office Action dated Jan. 7, 2014 and English translation of notice of reasons for rejection.

(Continued)

*Primary Examiner* — Troy Chambers
*Assistant Examiner* — Jake Cook
(74) *Attorney, Agent, or Firm* — Roberts Mlotkowski Safran & Cole P.C.

(57) ABSTRACT

In a shift lever device, a first-link is held at a permitting-position due to a release button being operated. Therefore, when a shift lever is operated from a "P" shift position, when a second-link is pushed toward a vehicle right side by the shift lever, even if a magnet is not energized, the second-link is rotated in a state where sliding of the first-link toward a vehicle right is impeded. Operation of the shift lever from the "P" shift position is thereby forcibly permitted. Here, the first-link is disposed at the permitting-position that is an initial-position, and, due to the release button being operated, the first-link is held at the permitting-position. Therefore, there is no need to move the first-link by operation of the release button, and the operation load and operation stroke of the release button can be made to be small.

11 Claims, 12 Drawing Sheets

(56) References Cited

U.S. PATENT DOCUMENTS

2008/0006115 A1* 1/2008 Mitteer .................... 74/473.21
2008/0098846 A1   5/2008 Kitten et al.
2008/0141807 A1   6/2008 Kimura et al.
2010/0083784 A1* 4/2010 Bortolon et al. ........... 74/473.21

2011/0174106 A1   7/2011 Ito

OTHER PUBLICATIONS

Chinese Office Action dated Dec. 4, 2013 and English translation of notices of reasons for rejection.

* cited by examiner

SHIFT DEVICE

CROSS-REFERENCE TO RELATED APPLICATION

This application claims priority under 35 USC 119 from Japanese Patent Application No. 2010-236404 filed Oct. 21, 2010, the disclosure of which is incorporated by reference herein.

BACKGROUND OF THE INVENTION

1. Field of the Invention

The present invention relates to a shift device at which a shift position is changed by a shift member being operated.

2. Related Art

As a shift lever device, there is a device in which an electromagnet holding member and an attraction plate holding member are made to be rotatable with the rotational centers thereof being the same, and an electromagnet is held at the electromagnet holding member, and an attraction plate is held at the attraction plate holding member (see, for example, Japanese Patent Application Laid-Open (JP-A) No. 2007-22375).

In this shift lever device, the electromagnet holding member and the attraction plate holding member are urged toward an initial rotation position side by an electromagnet urging member and an attraction plate urging member, respectively. The attraction plate holding member is caught at the initial rotation position, and the electromagnet holding member is caught at the initial rotation position due to contact of the electromagnet with the attraction plate.

When a shift lever is operated from the "P" shift position, rotational force is inputted from the shift lever to the electromagnet holding member, and the electromagnet holding member is rotated against the urging force of the electromagnet urging member.

In the state in which the electromagnet is not generating magnetic force and is not attracting the attraction plate, even if the electromagnet holding member is rotated, the attraction plate holding member is not rotated. Due thereto, operation of the shift lever from the "P" shift position is impeded (shift locked state) due to the attraction plate holding member impeding operation of the shift lever.

On the other hand, in the state in which the electromagnet generates magnetic force and attracts the attraction plate, the attraction plate holding member is rotated integrally with the rotation of the electromagnet holding member, against the urging force of the attraction plate urging member. Due thereto, operation of the shift lever from the "P" shift position is permitted (shift locking released state) due to the attraction plate holding member permitting operation of the shift lever.

Generally, a release button is provided at a shift lever device. When the release button is operated, the attraction plate holding member is forcibly rotated against the urging force of the attraction plate urging member, interlockingly with the release button. Due thereto, even when the electromagnet is not generating magnetic force, operation of the shift lever from the "P" shift position is permitted (state of forcibly releasing shift locking).

However, as described above, there is the need to rotate the attraction plate holding member against the urging force of the attraction plate urging member by operation of the release button. Therefore, there are cases in which measures are needed to make it such that the operation load and the operation stroke of the release button do not become large.

SUMMARY OF THE INVENTION

In view of the aforementioned, an object of the present invention is to obtain a shift device that can make the operation load and the operation stroke of an operation member small.

A shift device of a first aspect of the present invention has: a shift member whose shift position is changed by the shift member being operated; a placed member that is disposed at a permitting position, operation of the shift member from a predetermined shift position being permitted due to the placed member being held at the permitting position at a time when the shift member is operated from the predetermined shift position, and operation of the shift member from the predetermined shift position being impeded due to the placed member being moved to an impeding position at a time when the shift member is operated from the predetermined shift position; and an operation member, the placed member being held at the permitting position by the operation member being operated.

In a shift device of a second aspect of the present invention, the shift device of the first aspect further has an urging member that urges the placed member to place the placed member at the permitting position.

In a shift device of a third aspect of the present invention, the shift device of the first aspect or the second aspect further has a moving member that switches permitting and impeding of operation of the shift member from the predetermined shift position by a motion of the moving member being changed (moving direction of the moving member being switched), due to placement of the placed member being switched between the permitting position and the impeding position at a time when the shift member is operated from the predetermined shift position.

It is possible that the moving member is provided at the placed member so as to be relatively rotatable or movable with respect to the placed member.

It is possible that the moving member is rotatable around an axis at the placed member, and operation of the shift member from the predetermined shift position is permitted due to the moving member being rotated around the axis in a state where the placed member is held at the permitting position at a time when the shift member is operated from the predetermined shift position.

It is possible that the moving member is movable along a predetermined direction at the placed member, and operation of the shift member from the predetermined shift position is permitted due to the moving member being moved along the predetermined direction in a state where the placed member is held at the permitting position at a time when the shift member is operated from the predetermined shift position.

It is possible that the device further has a stop portion that stops movement of the moving member, and operation of the shift member from the predetermined shift position is impeded due to the placed member being moved to the impeding position so that the moving member is caught at the stop portion.

In the shift device of the first aspect, the shift position is changed by the shift member being operated.

At the time when the shift member is operated from the predetermined shift position, due to the placed member being held at the permitting position, operation of the shift member from the predetermined shift position is permitted. On the other hand, at the time when the shift member is operated from the predetermined shift position, due to the placed member being moved to the impeding position, operation of the shift member from the predetermined shift position is impeded.

The placed member is held at the permitting position by the operation member being operated. Therefore, operation of the shift member from the predetermined shift position is permitted.

Here, the placed member is disposed at the permitting position, and, as described above, the placed member is held at the permitting position due to the operation member being operated.

Therefore, there is no need to move the placed member by operation of the operation member. Due thereto, even when load is needed in order to move the placed member, the operation load of the operation member can be made to be small, and the operation stroke of the operation member can be made to be small.

In the shift device of the second aspect, the urging member urges the placed member and places the placed member at the permitting position. Therefore, the placed member can be placed at the permitting position by a simple structure.

In the shift device of the third aspect, the moving member switches permitting and impeding of operation of the shift member from the predetermined shift position by a motion of the moving member being changed (moving direction of the moving member being switched), due to placement of the placed member being switched between the permitting position and the impeding position at a time when the shift member is operated from the predetermined shift position. Therefore, by a simple structure, it is possible to switch between permitting and impeding of operation of the shift member from the predetermined shift position.

BRIEF DESCRIPTION OF THE DRAWINGS

Embodiments of the invention will be described in detail with reference to the following figures, wherein.

DETAILED DESCRIPTION OF THE INVENTION

First Exemplary Embodiment

Figure 1:
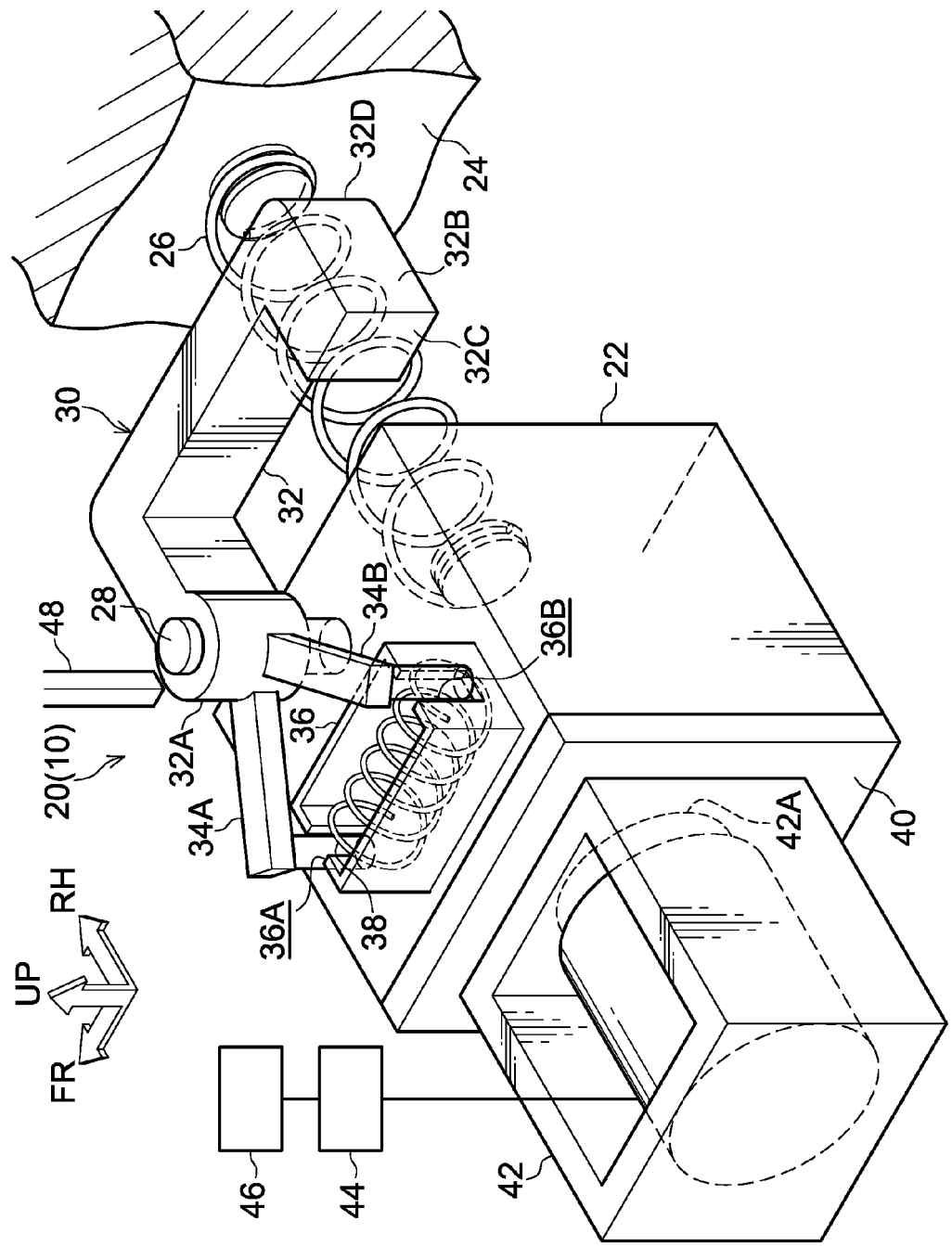
FIG. 1 is a perspective view seen obliquely from the vehicle left and rear, showing a shift lock mechanism of a shift lever device relating to a first exemplary embodiment of the present invention.
Figure 2:
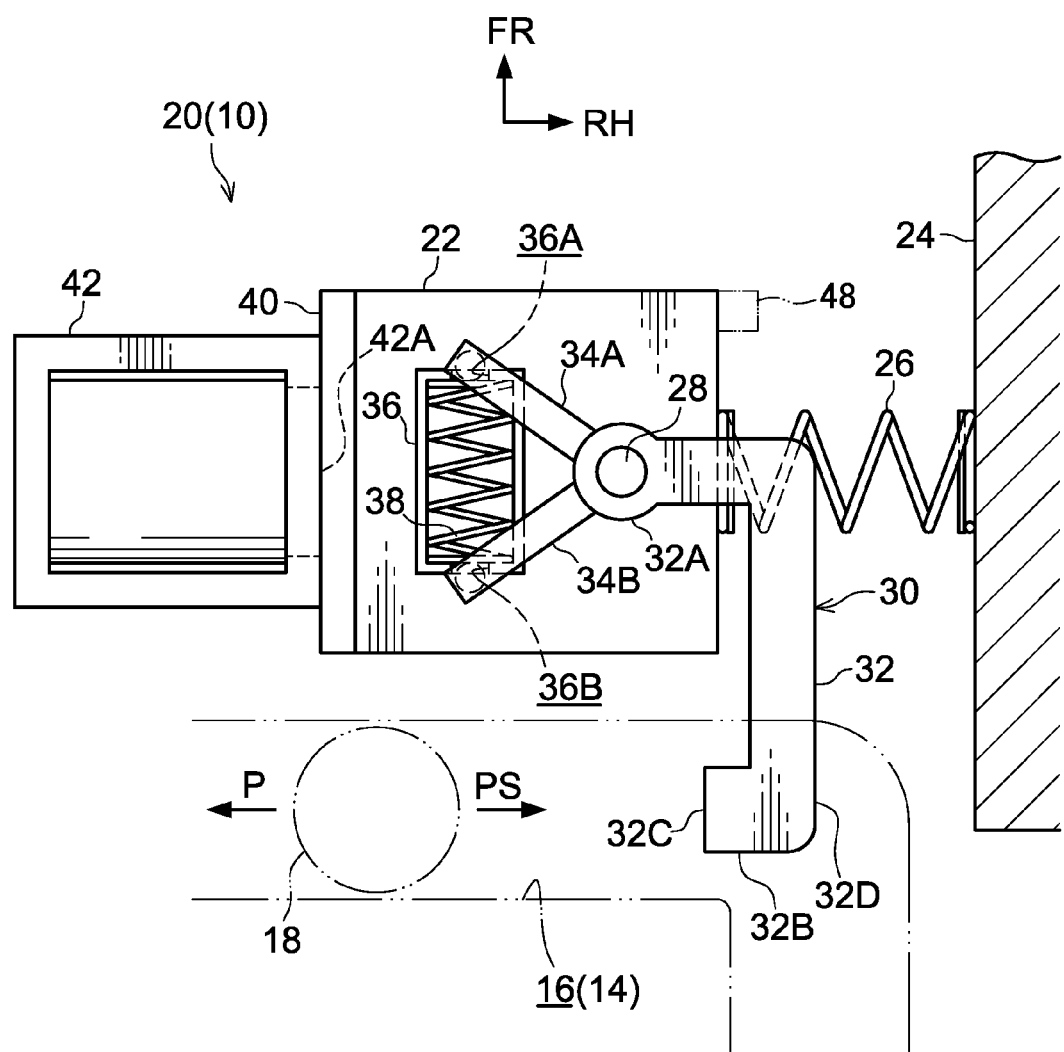
FIG. 2 is a plan view, seen from above, showing the shift lock mechanism of the shift lever device relating to the first exemplary embodiment of the present invention.
Figure 5:
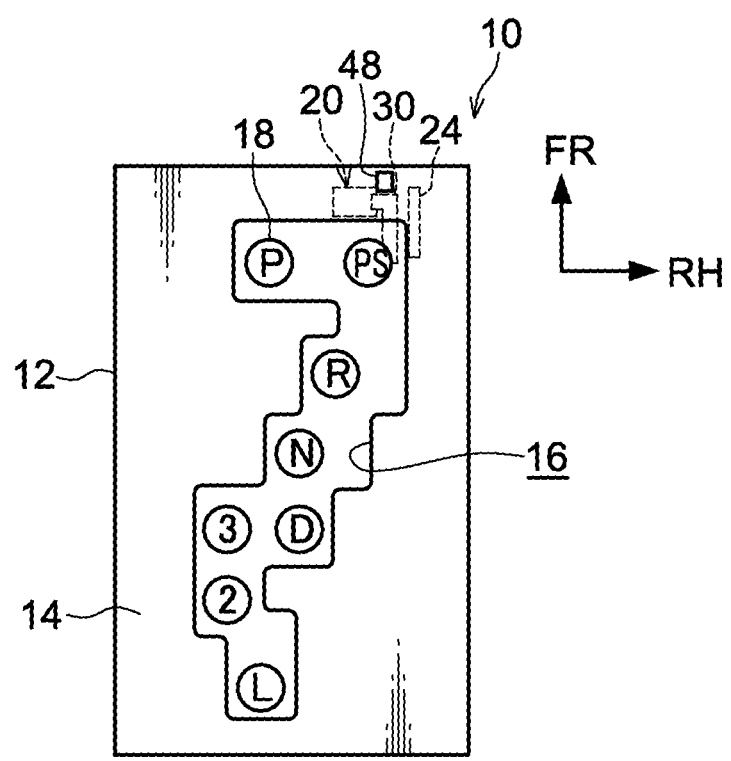
FIG. 5 is a plan view, seen from above, showing the shift lever device relating to the first exemplary embodiment of the present invention.

Main portions of a shift lever device 10 serving as a shift device relating to a first exemplary embodiment of the present invention are shown in FIG. 1 in a perspective view seen obliquely from the vehicle left and rear. The main portions of the shift lever device 10 are shown in FIG. 2 in a plan view seen from above. Moreover, the shift lever device 10 is shown in FIG. 5 in a plan view seen from above. Note that, in the drawings, the vehicle front is indicated by arrow FR, the vehicle right is indicated by arrow RH, and upward is indicated by arrow UP.

The shift lever device 10 relating to the present exemplary embodiment is a so-called floor-type and gate-type device.

As shown in FIG. 5, a housing 12, that is shaped as a substantially parallelepiped box and serves as a set member, is provided at the shift lever device 10. The housing 12 is set at the vehicle front side portion and the vehicle left and right direction (vehicle transverse direction) central portion of the floor portion (floor) at the vehicle cabin of the vehicle. The upper wall of the housing 12 is a plate-shaped cover 14. An operation groove 16, that is a predetermined bent shape and serves as an operation path, is formed to pass through the cover 14.

A shift lever 18, that is shaped as a substantially elongated circular rod and serves as a shift member (a push member), is provided at the shift lever device 10. At the lower end thereof, the shift lever 18 is supported at the lower end of the housing 12 interior. The shift lever 18 can be operated (rotated), around the lower end thereof, in the vehicle front and rear direction and the vehicle left and right direction.

The upper side portion of the shift lever 18 is passed through the operation groove 16 of the cover 14. Due to the shift lever 18 being operated along the operation groove 16, the shift position can be changed to a "P" shift position that serves as a predetermined shift position, an "R" shift position, an "N" shift position, a "D" shift position, a "3" shift position, a "2" shift position and an "L" shift position. Further, when the shift lever 18 is operated from the "P" shift position toward the "R" shift position, the shift lever 18 is operated toward the vehicle right (one way in the vehicle transverse direction), and, after reaching a "PS" position, is operated toward the vehicle rear and the vehicle left (the other way in the vehicle transverse direction) in that order.

A shift lock mechanism 20 (shift lock unit) is fixed at the housing 12 interior. The shift lock mechanism 20 is disposed at the lower side and the vehicle front side of the "PS" position of the operation groove 16 of the cover 14.

Figure 3:
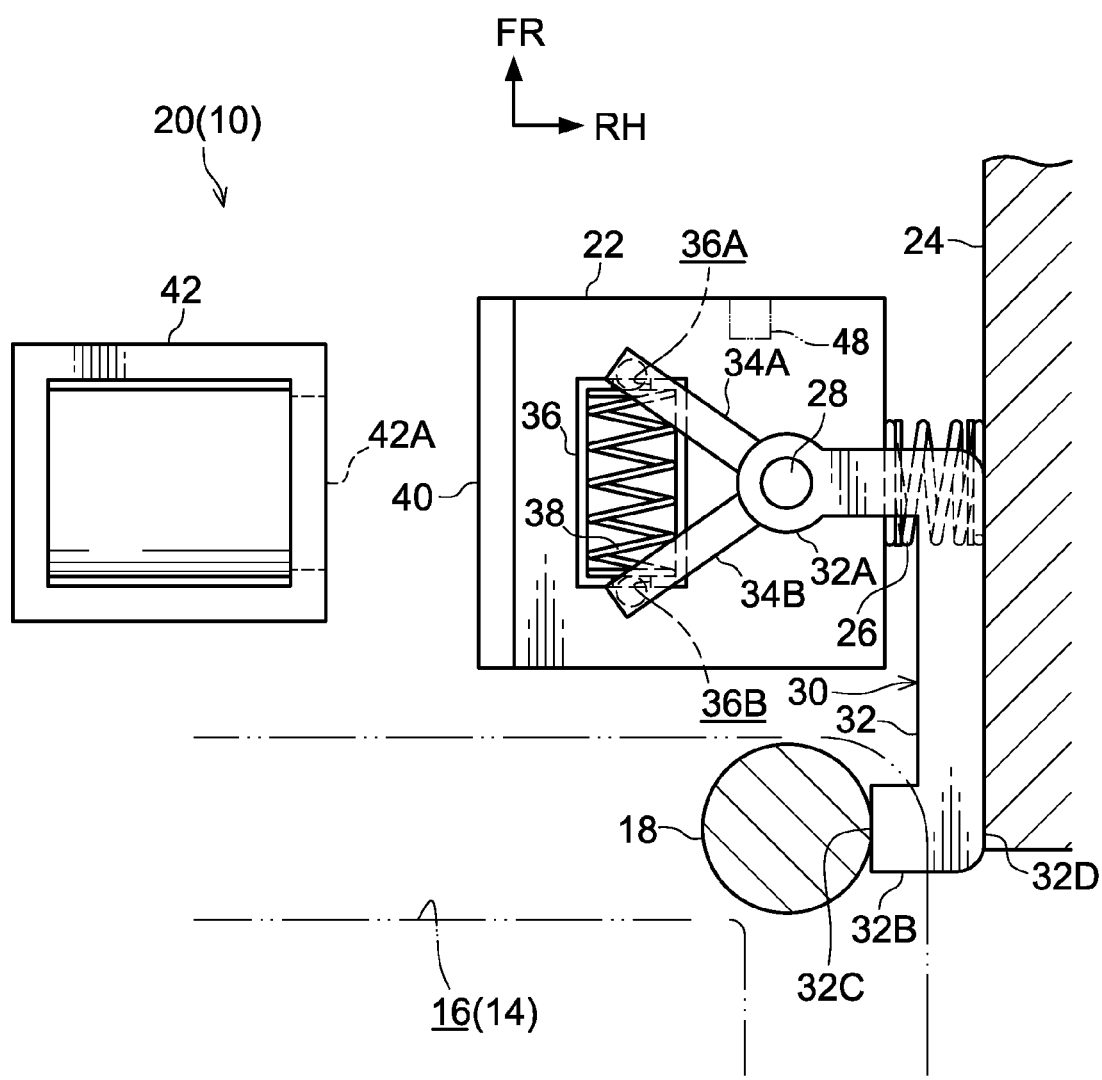
FIG. 3 is a plan view, seen from above, showing the time of shift locking at the shift lock mechanism of the shift lever device relating to the first exemplary embodiment of the present invention.

As shown in FIG. 1 and FIG. 2, a first link 22, that is parallelepiped and structures a placed member, is provided at the shift lock mechanism 20. The first link 22 can be slid in the vehicle left and right direction between a permitting position (the lock releasing position as shown in FIG. 1 and FIG. 2), that is the initial position, and an impeding position (the locking position as shown in FIG. 3).

A stop (catch) wall 24 serving as a stop (catch) member is fixed at the vehicle right side of the first link 22. The vehicle left side surface of the stop wall 24 is disposed perpendicular to the vehicle left and right direction. Note that the stop wall 24 may be structured by a portion (including the peripheral edge of a gate groove) of a high-strength, plate-shaped reinforcing gate in which the gate groove is formed to pass through. The gate groove is substantially the same shape as the operation groove 16, and the shift lever 18 passes therethrough.

A first return spring 26 serving as an urging member spans between the first link 22 and the stop wall 24. The first return spring 26 is a compression coil spring, and urges the first link 22 toward the vehicle left (the side opposite the stop wall 24).

A supporting shaft 28 that is circular shaft shaped is fixed to the first link 22. The supporting shaft 28 projects upward from the top surface of the first link 22.

A second link 30, that is shaped as a U-shaped rod and serves as a moving member, is supported at the supporting shaft 28. A link main body 32, that is shaped as a U-shaped rod, is provided at the second link 30. At a proximal end portion 32A of the link main body 32, the second link 30 is rotatably (relative-rotatably) supported by the supporting shaft 28. A distal end portion 32B of the link main body 32 is disposed at the lower side of the "PS" position of the operation groove 16 of the cover 14.

The vehicle left side surface of the distal end portion 32B of the link main body 32 is a lock surface 32C that is planar and serves as an impeding portion. The lock surface 32C is disposed perpendicular to the vehicle left and right direction. The vehicle right side surface of the distal end portion 32B of the link main body 32 is a push surface 32D serving as a push portion. The push surface 32D is disposed perpendicular to the vehicle left and right direction. Note that at least one of the lock surface 32C and the push surface 32D may be inclined in a direction heading toward the vehicle right or the vehicle left while heading toward the vehicle front.

When the shift lever 18 is operated from the "P" shift position and reaches the "PS" position, the lock surface 32C of the second link 30 is pushed toward the vehicle right side by the shift lever 18. On the other hand, when the shift lever 18 is operated from the "R" shift position and reaches the "PS" position, the push surface 32D of the second link 30 is pushed toward the vehicle left side by the vehicle left side portion of the shift lever 18.

A pair of moving rods 34A, 34B, that are shaped as L-shaped rods and serve as moving portion, are provided integrally with the proximal end portion 32A of the link main body 32. The proximal end portion of the moving rod 34A extends in a direction heading toward the vehicle front while heading toward the vehicle left, from the proximal end portion 32A of the link main body 32. The proximal end portion of the moving rod 34B extends in a direction heading toward the vehicle rear while heading toward the vehicle left, from the proximal end portion 32A of the link main body 32. The distal end portions of the moving rods 34A, 34B extend downward.

An accommodating box 36, that is shaped as a parallelepiped box, is fixed to the top surface of the first link 22. The accommodating box 36 is elongated in the vehicle front and rear direction. The top surface of the accommodating box 36 is open. Open holes 36A, 36B that are rectangular are formed to pass-through the vehicle front side wall and the vehicle rear side wall, respectively, of the accommodating box 36. The open holes 36A, 36B open upward, and the distal end portions of the moving rods 34A, 34B of the second link 30 are inserted in the open holes 36A, 36B, respectively. Further, rotation of the second link 30 is permitted due to the distal end portion of one of the moving rods 34A, 34B being moved to the inside of the accommodating box 36 and the distal end portion of the other of the moving rods 34A, 34B being moved to the exterior of the accommodating box 36.

A second return spring 38 serving as a movement urging member is accommodated within the accommodating box 36. The second return spring 38 is a compression coil spring, and spans between the vehicle front side wall and the vehicle rear side wall of the accommodating box 36. The second return spring 38 also spans between the distal end portions of the moving rods 34A, 34B of the second link 30. Due thereto, rotation of the second link 30 is stopped (restricted), and the second link 30 is disposed at the initial position. Further, the urging force of the second return spring 38 is made to be greater than the urging force of the first return spring 26.

A yoke plate 40, that is rectangular plate shaped and serves as an attracted member that structures the placed member, is held at the vehicle left side surface of the first link 22. The yoke plate 40 can be slid integrally with the first link 22, and is made of metal (e.g., made of iron).

A magnet 42 (electromagnet), that serves as a holding member (attracting member) and a switching member, is fixed at the vehicle left side of the yoke plate 40. An attraction surface 42A is provided at the vehicle right side surface of the magnet 42. The yoke plate 40 planarly contacts the attraction surface 42A due to the urging force of the first return spring 26. Due thereto, the first link 22 is stopped or caught (disposed) at the permitting position that is the initial position. Further, due to the first link 22 and the yoke plate 40 being slid toward the vehicle right against the urging force of the first return spring 26, the yoke plate 40 can be separated from the magnet 42 (the attraction surface 42A).

The magnet 42 is electrically connected to a control device 44 of the vehicle. A brake 46 of the vehicle is electrically connected to the control device 44. The vehicle is braked due to the brake 46 being operated.

In the state in which the brake 46 is not operated, due to the magnet 42 not being energized due to control of the control device 44, magnetic force is not generated at the attraction surface 42A, and the yoke plate 40 is not attracted to the attraction surface 42A. Due thereto, sliding of the yoke plate 40 and the first link 22 toward the vehicle right (in the impeding direction) is permitted, and the first link 22 can thereby slide from the permitting position toward the impeding position and is set in the impeding state (locking state).

On the other hand, in the state in which the brake 46 is operated, due to the magnet 42 being energized due to control of the control device 44, magnetic force is generated at the attraction surface 42A, and the yoke plate 40 is attracted to (held at) the attraction surface 42A. Due thereto, sliding of the yoke plate 40 and the first link 22 toward the vehicle right is impeded by the magnet 42, and the first link 22 is thereby held at the permitting position and is set in the permitting state (locking releasing state).

The urging force of the second return spring 38 is made to be small, as compared with the total of the attraction force of the magnet 42 (the attraction surface 42A) with respect to the yoke plate 40 and the urging force of the first return spring 26. Therefore, in the state in which the first link 22 is held at the permitting position by the magnet 42 as described above, the second link 30 can be rotated against the urging force of the second return spring 38, and the lock surface 32C of the second link 30 can be rotated toward the vehicle right side and the vehicle front side (in the permitting direction).

As shown in FIG. 1, FIG. 2 and FIG. 5, a release button 48, that is rod-shaped and serves as an operation member, is held at the cover 14 of the housing 12. The release button 48 is movable (slidable) in the up and down direction along the longitudinal direction thereof. A return spring (not shown in the drawings) serving as a return member spans between the cover 14 (the housing 12) and the release button 48. Due to the return spring urging the release button 48 toward the upper side (the exterior of the housing 12), the release button 48 is stopped (caught) in a state in which the upper end portion (one end portion) thereof projects-out toward the upper side from the cover 14.

The lower end portion (other end portion) of the release button 48 is disposed at the upper side at the vehicle right side of the vehicle front side end of the first link 22. Therefore, due to the upper end of the release button 48 being pushed and operated toward the lower side (the interior of the housing 12) against the urging force of the return spring, the lower end portion of the release button 48 is disposed at the vehicle right side of the vehicle front side end of the first link 22. Due thereto, the first link 22 is stopped at the lower end portion of the release button 48, and sliding of the yoke plate 40 and the first link 22 toward the vehicle right is impeded. Due thereto, the first link 22 is held at the permitting position, and is set in the forcibly permitting state (state of forcibly releasing locking).

Operation of the present exemplary embodiment is described next.

In the shift lever device 10 of the above-described structure, when the shift lever 18 is operated from the "P" shift position and reaches the "PS" position, the lock surface 32C of the second link 30 is pushed toward the vehicle right side by the shift lever 18.

In the state in which the brake 46 is not operated, the magnet 42 is not energized due to the control of the control device 44, and the yoke plate 40 is not attracted to the attraction surface 42A of the magnet 42. Further, the urging force of the second return spring 38 is made to be greater than the urging force of the first return spring 26.

Therefore, at the time when the lock surface 32C of the second link 30 is pushed toward the vehicle right side by the shift lever 18, as shown in FIG. 3, in the state in which rotation of the second link 30 against the urging force of the second return spring 38 is impeded, the first link 22, the yoke plate 40 and the second link 30 are slid toward the vehicle right against the urging force of the first return spring 26, and the first link 22 is disposed at the impeding position, and the second link 30 is stopped at (planarly contacts) the stop wall 24. Due thereto, rotation of the second link 30 by the pushing force of the shift lever 18 is stopped by the stop wall 24, and the lock surface 32C of the second link 30 is not rotated toward the vehicle right side and the vehicle front side. Due thereto, operation of the shift lever 18 to the "PS" position is impeded by the lock surface 32C of the second link 30, and operation of the shift lever 18 from the "P" shift position to the "R" shift position is impeded (locked).

On the other hand, in the state in which the brake 46 is operated, the magnet 42 is energized due to control of the control device 44, and the yoke plate 40 is attracted to the attraction surface 42A of the magnet 42. Further, the urging force of the second return spring 38 is made to be smaller than the total of the urging force of the first return spring 26 and the attraction force of the magnet 42 with respect to the yoke plate 40.

Figure 4:
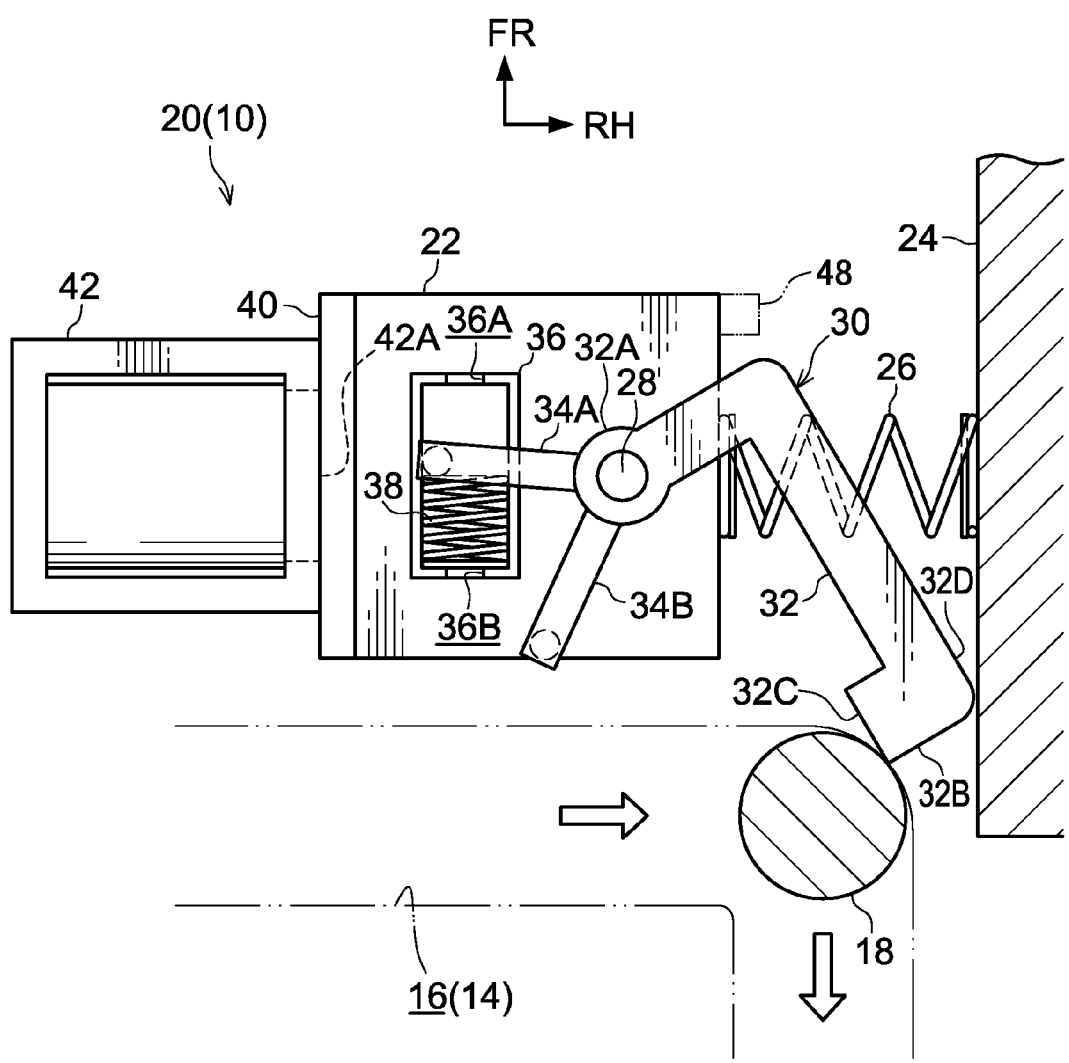
FIG. 4 is a plan view, seen from above, showing the time of shift locking release at the shift lock mechanism of the shift lever device relating to the first exemplary embodiment of the present invention.

Therefore, at the time when the lock surface 32C of the second link 30 is pushed toward the vehicle right side by the shift lever 18, as shown in FIG. 4, in the state in which sliding of the first link 22, the yoke plate 40 and the second link 30 toward the vehicle right against the urging force of the first return spring 26 and the attraction force of the magnet 42 with respect to the yoke plate 40 is impeded, the second link 30 is rotated against the urging force of the second return spring 38. Due thereto, due to the lock surface 32C of the second link 30 being rotated toward the vehicle right side and the vehicle front side, operation of the shift lever 18 to the "PS" position is permitted, and operation of the shift lever 18 from the "P" shift position to the "R" shift position is permitted (locking released).

In this way, at the time when the shift lever 18 is operated from the "P" shift position and reaches the "PS" position, the magnet 42 (attraction surface 42A) switches between attraction and non-attraction with respect to the yoke plate 40, and the placement of the first link 22 is switched between the permitting position and the impeding position. Due thereto, the moving direction of the second link 30 is switched between the sliding direction toward the vehicle right and the rotating direction toward the vehicle right side and the vehicle front side, and impeding and permitting of operation of the shift lever 18 from the "P" shift position to the "R" shift position are switched. Therefore, with a simple structure, it is possible to switch between impeding and permitting of operation of the shift lever 18 from the "P" shift position to the "R" shift position.

Further, at the time when the shift lever 18 is operated from the "R" shift position and reaches the "PS" position, due to the push surface 32D of the second link 30 being pushed toward the vehicle left side by the vehicle left side portion of the shift lever 18, the second link 30 is rotated against the urging force of the second return spring 38. Due thereto, due to the distal end portion 32B of the second link 30 being rotated toward the vehicle left side and the vehicle front side, operation of the shift lever 18 to the "PS" position is permitted, and operation of the shift lever 18 from the "R" shift position to the "P" shift position is permitted.

Due to the upper end of the release button 48 being pushed and operated toward the lower side against the urging force of the return spring, the lower end portion of the release button 48 is placed at the vehicle right side of the vehicle front side end of the first link 22. The first link 22 is thereby stopped (caught) at the lower end portion of the release button 48, and, due thereto, sliding of the yoke plate 40 and the first link 22 toward the vehicle right is impeded, and the first link 22 is held at the permitting position.

Therefore, at the time when the shift lever 18 is operated from the "P" shift position and reaches the "PS" position, when the lock surface 32C of the second link 30 is pushed toward the vehicle right side by the shift lever 18, even if the magnet 42 is not energized (even if the yoke plate 40 is not attracted by the attraction surface 42A of the magnet 42), as shown in FIG. 4, in a state in which sliding of the first link 22 and the yoke plate 40 toward the vehicle right is impeded, the second link 30 is rotated against the urging force of the second return spring 38. The lock surface 32C of the second link 30 is thereby rotated toward the vehicle right side and the vehicle front side, and, due thereto, operation of the shift lever 18 to the "PS" position is permitted, and operation of the shift lever 18 from the "P" shift position to the "R" shift position is forcibly permitted (locking released forcibly).

Here, the first link 22 is disposed at the permitting position that is the initial position, and, as described above, the first link 22 is held at the permitting position due to the release button 48 being pushed and operated.

Therefore, there is no need to move the first link 22 and the yoke plate 40 by the pushing operation of the release button 48. Due thereto, there is no need to move the first link 22 and the yoke plate 40 against the urging force that urges the first link 22 and the yoke plate 40 by pushing operation of the release button 48, and the pushing operation load of the release button 48 can be made to be small. Further, the pushing operation stroke of the release button 48 can be made to be small, and the projecting amount of the upper end portion of the release button 48 from the cover 14 toward the upper side can be made to be small.

Moreover, the first return spring 26 urges the first link 22 and the yoke plate 40, and disposes the first link 22 at the permitting position. Therefore, the first link 22 can be disposed at the permitting position by a simple structure.

Second Exemplary Embodiment

Figure 6:
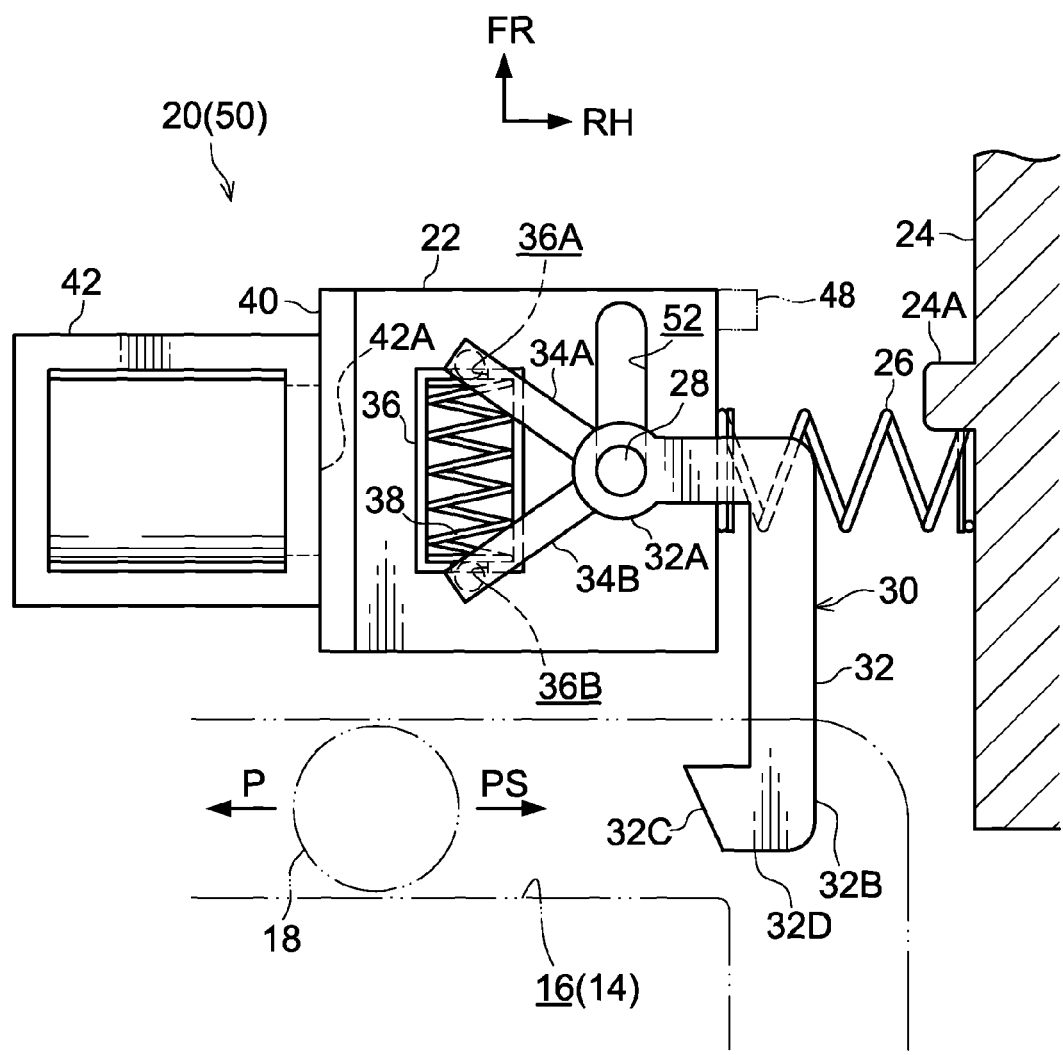
FIG. 6 is a plan view, seen from above, showing a shift lock mechanism of a shift lever device relating to a second exemplary embodiment of the present invention.

Main portions of a shift lever device 50, that serves as a shift device relating to a second exemplary embodiment of the present invention, are shown in FIG. 6 in a plan view seen from above.

The shift lever device 50 relating to the present exemplary embodiment has a substantially similar structure as the above-described first exemplary embodiment, but differs with respect to the following points.

As shown in FIG. 6, in the shift lever device 50 relating to the present exemplary embodiment, a link hole 52 that is elongated in plan view is formed in the first link 22. The link hole 52 is open from the top surface of the first link 22, and is disposed parallel to the vehicle front and rear direction. The lower side portion of the supporting shaft 28 is inserted in the end portion at the vehicle rear side of the link hole 52. The supporting shaft 28 is unable to rotate, and can be slid (relatively moved) in the longitudinal direction of the link hole 52.

The second link 30 is supported at the supporting shaft 28 so as to be unable to rotate. The lock surface 32C of the second link 30 is inclined in a direction heading toward the vehicle left while heading toward the vehicle front. The push surface 32D of the second link 30 is the vehicle rear side surface of the distal end portion 32B, and the push surface 32D is disposed perpendicular to the vehicle front and rear direction. Note that the push surface 32D may be inclined in a direction heading toward the vehicle right or the vehicle left while heading toward the vehicle front.

An stop projection 24A, that is parallelepiped and serves as a stop (catch) portion, is formed integrally with the vehicle left side surface of the stop wall 24. The stop projection 24A projects from the stop wall 24 toward the vehicle left side, and is disposed at the vehicle front side of the link main body 32 of the second link 30.

Here, at the time when the shift lever 18 is operated from the "P" shift position and reaches the "PS" position, in a case in which the magnet 42 is not generating magnetic force and the yoke plate 40 is not attracted to the attraction surface 42A of the magnet 42, in a state in which sliding of the second link 30 toward the vehicle front side against the urging force of the second return spring 38 is impeded, the first link 22, the yoke plate 40 and the second link 30 are slid toward the vehicle right against the urging force of the first return spring 26, and the first link 22 is disposed at the impeding position, and the link main body 32 of the second link 30 is stopped at (planarly contacts) the stop wall 24 and the stop projection 24A. Due thereto, sliding of the second link 30 toward the vehicle right side and the vehicle front side due to the pushing force of the shift lever 18 is stopped by the stop wall 24 and the stop projection 24A, and the lock surface 32C of the second link 30 is not slid toward the vehicle right side and the vehicle front side. Due thereto, operation of the shift lever 18 to the "PS" position is impeded by the lock surface 32C of the second link 30, and operation of the shift lever 18 from the "P" shift position to the "R" shift position is impeded.

On the other hand, at the time when the shift lever 18 is operated from the "P" shift position and reaches the "PS" position, in a case in which the magnet 42 is generating magnetic force and the yoke plate 40 is attracted to the attraction surface 42A of the magnet 42, in a state in which sliding of the first link 22, the yoke plate 40 and the second link 30 toward the vehicle right against the urging force of the first return spring 26 and the attraction force of the magnet 42 with respect to the yoke plate 40 is impeded, the supporting shaft 28 is slid toward the vehicle front side along the link hole 52 against the urging force of the second return spring 38, and the second link 30 is slid toward the vehicle front side against the urging force of the second return spring 38. Therefore, due to the lock surface 32C of the second link 30 being slid toward the vehicle front side, operation of the shift lever 18 from the "P" shift position to the "PS" position is permitted, and operation of the shift lever 18 from the "P" shift position to the "R" shift position is permitted.

Moreover, at the time when the shift lever 18 is operated from the "R" shift position and reaches the "PS" position, due to the push surface 32D of the second link 30 being pushed toward the vehicle front side by the shift lever 18, the supporting shaft 28 is slid toward the vehicle front side along the link hole 52 against the urging force of the second return spring 38, and the second link 30 is slid toward the vehicle front side against the urging force of the second return spring 38. Therefore, operation of the shift lever 18 to the "PS" position is permitted, and operation of the shift lever 18 from the "R" shift position to the "P" shift position is permitted.

Here, in the present exemplary embodiment as well, operation and effects that are similar to those of the above-described first exemplary embodiment can be achieved.

Note that the present exemplary embodiment is structured such that the link hole 52 of the first link 22 is disposed parallel to the vehicle front and rear direction, but may be structured such that the link hole 52 of the first link 22 is inclined in a direction heading toward the vehicle right or the vehicle left while heading toward the vehicle front. Further, when the link hole 52 of the first link 22 is structured to be inclined in a direction heading toward the vehicle right while heading toward the vehicle front, the lock surface 32C of the second link 30 may be disposed perpendicular to the vehicle left and right direction, or may be inclined in a direction heading toward the vehicle right while heading toward the vehicle front.

Third Exemplary Embodiment

Figure 7:
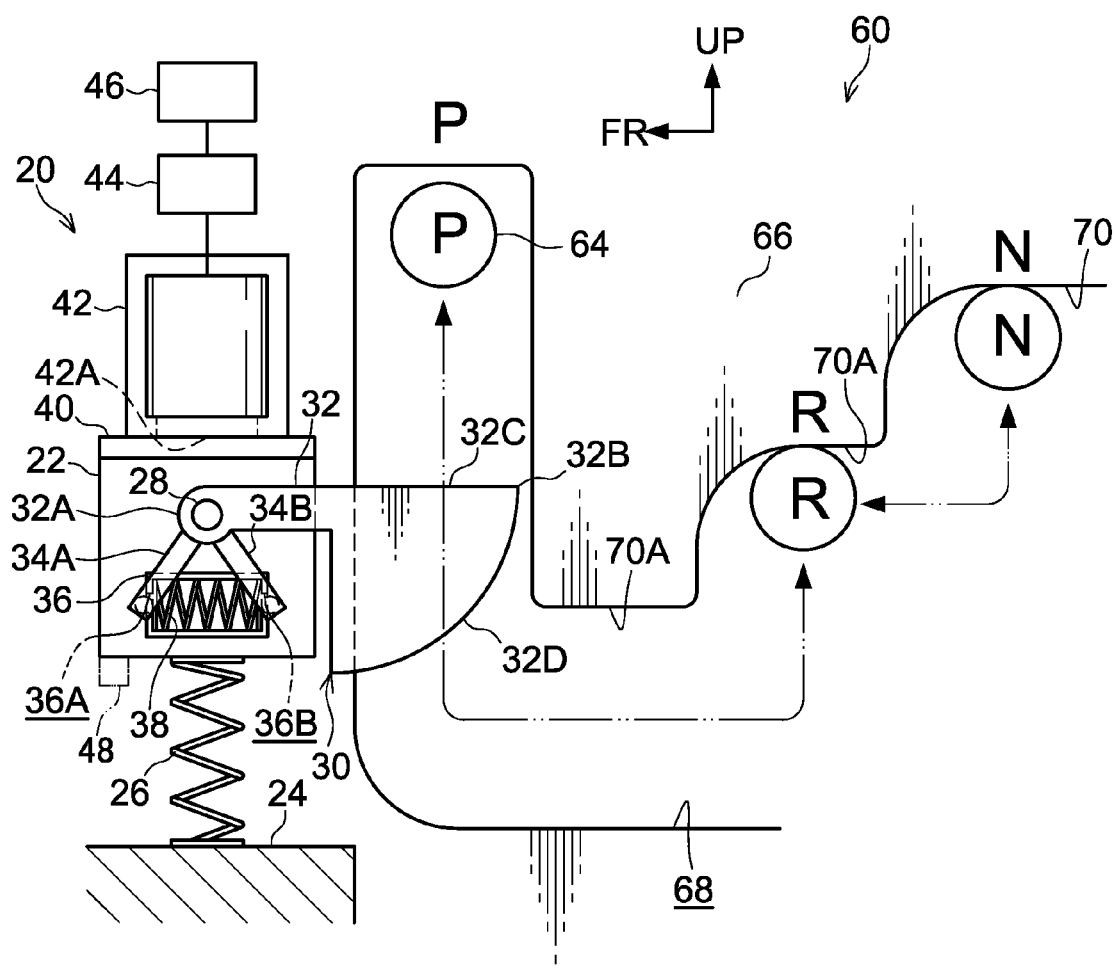
FIG. 7 is a side view, seen from the vehicle left, showing a shift lock mechanism of a shift lever device relating to a third exemplary embodiment of the present invention.

Main portions of a shift lever device 60 serving as a shift device relating to a third exemplary embodiment of the present invention are shown in FIG. 7 in a side view seen from the vehicle left. The shift lever device 60 is shown in FIG. 8 in a plan view seen from above.

The shift lever device 60 relating to the present exemplary embodiment has a substantially similar structure as the above-described first exemplary embodiment, but differs with respect to the following points.

Figure 8:
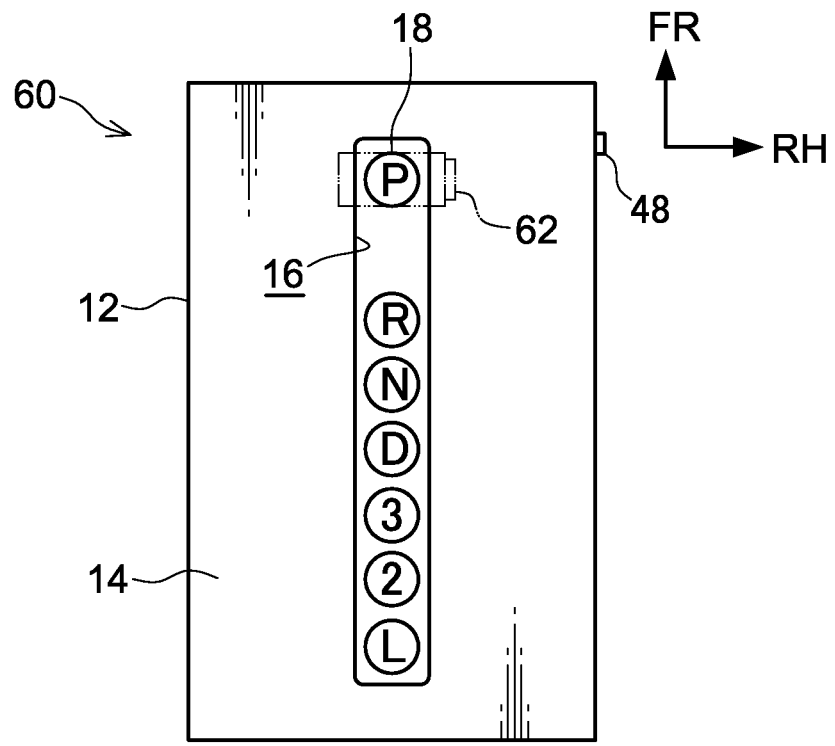
FIG. 8 is a plan view, seen from above, showing the shift lock mechanism of the shift lever device relating to the third exemplary embodiment of the present invention.

As shown in FIG. 8, the shift lever device 60 relating to the present exemplary embodiment is a so-called straight type device, and the operation groove 16 of the cover 14 is disposed parallel to the vehicle front and rear direction. Therefore, due to the shift lever 18 being operated in the vehicle front and rear direction along the operation groove 16, the shift position can be changed to the "P" shift position, the "R" shift position, the "N" shift position, the "D" shift position, the "3" shift position, the "2" shift position and the "L" shift position.

An operation button 62 serving as an operation portion is provided at the upper end of the shift lever 18, and can be operated (pushed).

As shown in FIG. 7, a grooved pin 64 that serves as a push member is provided in a vicinity of the lower end of the shift lever 18. The grooved pin 64 can be moved (rotated) in the vehicle front and rear direction, together with the operation of the shift lever 18 in the vehicle front and rear direction.

Here, due to the operation button 62 being operated (pushed), the grooved pin 64 is moved (slid) toward the lower side (one side) of the shift lever 18. Further, due to operation of the operation button 62 being released, due to urging force, the operation button 62 is returned to the initial position, and the grooved pin 64 is moved toward the upper side (other side) of the shift lever 18.

Within the housing 12, a detent plate 66 serving as an engaging member is fixed at a vicinity of the grooved pin 64. A detent hole 68 serving as an engaging hole is formed to pass through the detent plate 66. The grooved pin 64 is inserted in (passed through) the interior of the detent hole 68. A detent groove 70, that is formed in a convex and concave shape and that serves as an engaging groove, is formed in the upper edge (other side edge) of the detent hole 68. The detent groove 70 is formed in a concave shape at the position of the grooved pin 64 at each shift position of the shift lever 18. Detent mountains 70A (convex portions) serving as engaging portions are formed at the positions of the grooved pin 64 between specific shift positions of the shift lever 18.

At the time when the shift lever 18 is disposed at the "P" shift position, the "R" shift position, the "N" shift position, the "D" shift position, the "3" shift position, the "2" shift position and the "L" shift position, the grooved pin 64 is disposed, respectively, at a "P" position, an "R" position, an "N" position, a "D" position, a "3" position, a "2" position and an "L" position of the detent hole 68.

In the state in which the operation button 62 is not operated and the grooved pin 64 is not moved toward the lower side of the shift lever 18, at the time when the shift lever 18 is operated, operation of the shift lever 18 is impeded in a case in which the grooved pin 64 is engaged with the detent mountain 70A of the detent groove 70.

On the other hand, in the state in which the operation button 62 is operated and the grooved pin 64 is moved toward the lower side of the shift lever 18, at the time when the shift lever 18 is operated, operation of the shift lever 18 is permitted because the grooved pin 64 is not engaged with the detent mountain 70A of the detent groove 70.

In particular, at the time when the shift lever 18 is operated from the "P" shift position to the "R" shift position, and at the time when the shift lever 18 is operated from the "R" shift position to the "P" shift position, in a case in which the operation button 62 is not operated and the grooved pin 64 is not moved toward the lower side of the shift lever 18, operation of the shift lever 18 is impeded due to the grooved pin 64 engaging with the detent mountain 70A between the "P" position and the "R" position of the detent hole 68.

The shift lock mechanism 20 is disposed at the vehicle front side of the detent hole 68, and the stop wall 24 and the magnet 42 of the shift lock mechanism 20 are disposed at the lower side and the upper side, respectively.

The link main body 32 of the second link 30 is shaped as an L-shaped rod, and extends from the supporting shaft 28 toward the vehicle rear side. At the side of the detent hole 68, the distal end portion 32B of the link main body 32 is disposed at the lower side of the "P" position of the detent hole 68.

The lock surface 32C of the link main body 32 is the upper side surface of the distal end portion 32B, and the lock surface 32C is disposed perpendicular to the up and down direction. The push surface 32D of the link main body 32 is the lower side surface of the distal end portion 32B, and the push surface 32D is inclined (curved) in a direction heading downward while heading toward the vehicle front. Note that the lock surface 32C may be inclined in a direction heading upward or downward while heading toward the vehicle front. Further, the push surface 32D may be disposed perpendicular to the up and down direction, or may be inclined in a direction heading upward while heading toward the vehicle front.

In the state in which the shift lever 18 is disposed at the "P" shift position, when the operation button 62 is operated and the grooved pin 64 is moved toward the lower side of the shift lever 18, the lock surface 32C of the second link 30 is pushed toward the lower side by the grooved pin 64.

On the other hand, in the state in which the operation button 62 is operated and the grooved pin 64 is moved toward the lower side of the shift lever 18, after the shift lever 18 is operated from the "R" shift position to the "P" shift position, at the time when operation of the operation button 62 is released and the grooved pin 64 is moved toward the upper side of the shift lever 18, the push surface 32D of the second link 30 is pushed toward the upper side by the grooved pin 64.

The proximal end portion of the moving rod 34A of the second link 30 extends, from the proximal end portion 32A of the link main body 32, in a direction heading downward while heading toward the vehicle front. The proximal end portion of the moving rod 34B of the second link 30 extends, from the proximal end portion 32A of the link main body 32, in a direction heading downward while heading toward the vehicle rear. The accommodating box 36 is disposed at the lower side of the proximal end portion 32A of the link main body 32.

As shown in FIG. 7 and FIG. 8, the release button 48 is held at the vehicle right side wall of the housing 12, and the release button 48 is movable (slidable) in the vehicle left and right direction along the longitudinal direction thereof. A return spring between the housing 12 and the release button 48 urges the release button 48 toward the vehicle right side (the exterior of the housing 12). The release button 48 is stopped (caught) in a state in which the vehicle right side end portion (one end portion) thereof projects-out toward the vehicle right side from the housing 12. Further, the vehicle left side end portion (other end portion) of the release button 48 is disposed at the vehicle right side, at the lower side of the vehicle front side end of the first link 22.

Operation of the present exemplary embodiment is described next.

In the shift lever device 60 of the above-described structure, in the state in which the shift lever 18 is disposed at the "P" shift position, at the time when the operation button 62 is operated and the grooved pin 64 is moved toward the lower side of the shift lever 18, the lock surface 32C of the second link 30 is pushed toward the lower side by the grooved pin 64.

In the state in which the brake 46 is not operated, the magnet 42 is not energized due to control of the control device 44, and the yoke plate 40 is not attracted to the attraction surface 42A of the magnet 42. Further, the urging force of the second return spring 38 is made to be large as compared with the urging force of the first return spring 26.

Therefore, at the time when the lock surface 32C of the second link 30 is pushed toward the lower side by the grooved pin 64, in the state in which rotation of the second link 30 against the urging force of the second return spring 38 is impeded, the first link 22, the yoke plate 40 and the second link 30 are slid downward against the urging force of the first return spring 26, and the first link 22 is disposed at the impeding position, and the lower end of the distal end portion 32B of the second link 30 is stopped on the stop wall 24. Due thereto, rotation of the second link 30 due to the pushing force of the grooved pin 64 is stopped by the stop wall 24, and the lock surface 32C of the second link 30 is not rotated toward the lower side and the vehicle front side. Movement of the grooved pin 64 toward the shift lever 18 lower side (operation of the operation button 62) is thereby impeded by the lock surface 32C of the second link 30. Therefore, due to the grooved pin 64 engaging with the detent mountain 70A between the "P" position and the "R" position of the detent hole 68, operation of the shift lever 18 from the "P" shift position to the "R" shift position is impeded (locked).

On the other hand, in the state in which the brake 46 is operated, the magnet 42 is energized due to control of the control device 44, and the yoke plate 40 is attracted to the attraction surface 42A of the magnet 42. Further, the urging force of the second return spring 38 is made to be small as compared with the total of the urging force of the first return spring 26 and the attraction force of the magnet 42 with respect to the yoke plate 40.

Therefore, at the time when the lock surface 32C of the second link 30 is pushed toward the lower side by the grooved pin 64, in the state in which sliding of the first link 22, the yoke plate 40 and the second link 30 downward against the urging force of the first return spring 26 and the attraction force of the magnet 42 with respect to the yoke plate 40 is impeded, the second link 30 is rotated against the urging force of the second return spring 38. Due thereto, the lock surface 32C of the second link 30 is rotated toward the lower side and the vehicle front side, and movement of the grooved pin 64 toward the shift lever 18 lower side (operation of the operation button 62) is thereby permitted. Therefore, due to the grooved pin 64 not engaging with the detent mountain 70A between the "P" position and the "R" position of the detent hole 68, operation of the shift lever 18 from the "P" shift position to the "R" shift position is permitted (locking released).

Moreover, in the state in which the operation button 62 is operated and the grooved pin 64 is moved toward the lower side of the shift lever 18, after the shift lever 18 is operated from the "R" shift position to the "P" shift position, at the time when operation of the operation button 62 is released and the grooved pin 64 is moved toward the upper side of the shift lever 18, the push surface 32D of the second link 30 is pushed toward the upper side by the grooved pin 64, and the second link 30 is thereby rotated against the urging force of the second return spring 38. Therefore, due to the distal end portion 32B of the second link 30 being rotated toward the upper side and the vehicle front side, movement of the grooved pin 64 toward the shift lever 18 upper side is permitted, and movement of the grooved pin 64 to the "P" position of the detent hole 68 is permitted.

Further, due to the vehicle right side end of the release button 48 being pushed and operated toward the vehicle left side against the urging force of the return spring, the vehicle left side end of the release button 48 is disposed at the lower side of the vehicle front side end of the first link 22. Due thereto, due to the first link 22 being stopped at the vehicle left side end portion of the release button 48, sliding of the yoke plate 40 and the first link 22 downward is impeded, and the first link 22 is held at the permitting position.

Therefore, in the state in which the shift lever 18 is disposed at the "P" shift position, at the time when the operation button 62 is operated and the grooved pin 64 is moved toward the lower side of the shift lever 18, when the lock surface 32C of the second link 30 is pushed toward the lower side by the grooved pin 64, even if the magnet 42 is not energized (even if the yoke plate 40 is not attracted to the attraction surface 42A of the magnet 42), in the state in which sliding of the first link 22 and the yoke plate 40 downward is impeded, the second link 30 is rotated against the urging force of the second return spring 38. Due thereto, due to the lock surface 32C of the second link 30 being rotated toward the lower side and the vehicle front side, movement of the grooved pin 64 toward the shift lever 18 lower side (operation of the operation button 62) is permitted. Therefore, due to the grooved pin 64 not engaging with the detent mountain 70A between the "P" position and the "R" position of the detent hole 68, operation of the shift lever 18 from the "P" shift position to the "R" shift position is forcibly permitted (locking released forcibly).

Therefore, in the present exemplary embodiment as well, operation and effects that are similar to those of the above-described first embodiment can be achieved.

Fourth Exemplary Embodiment

Figure 9:
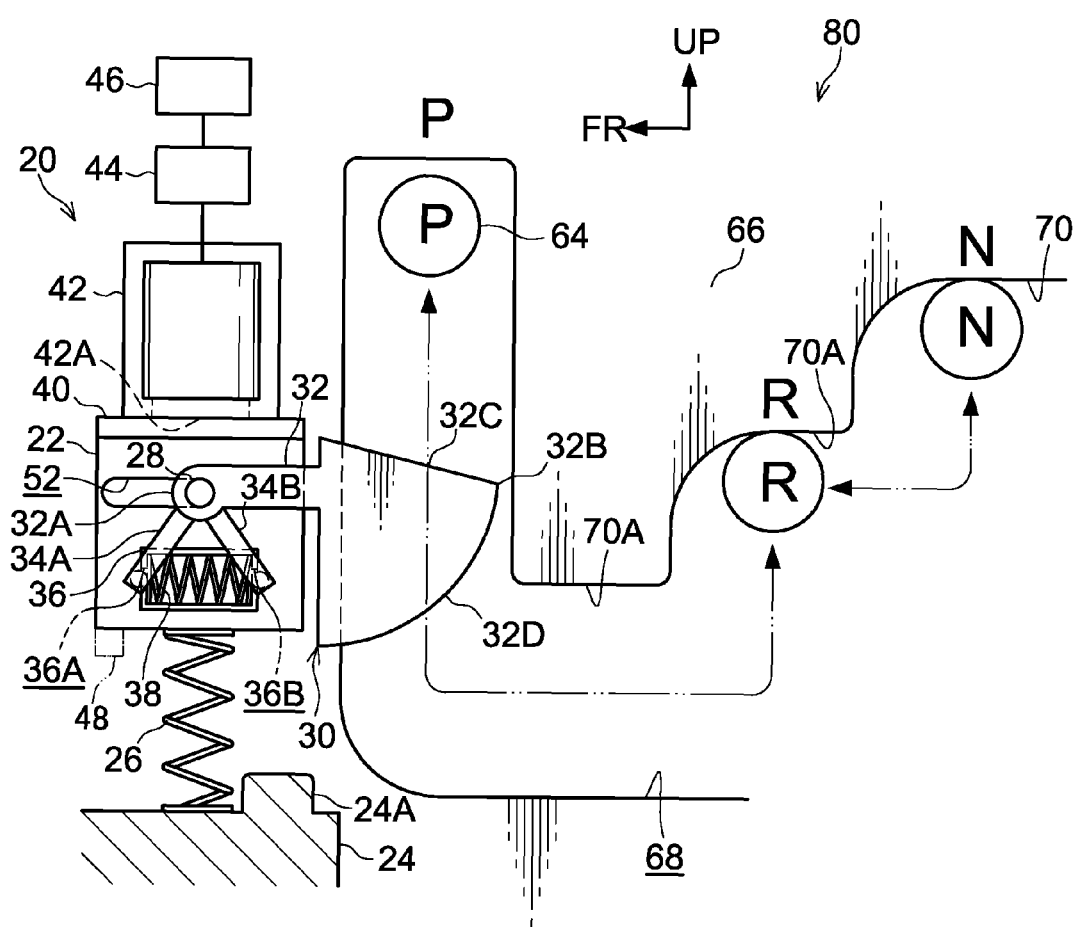
FIG. 9 is a side view, seen from the vehicle left, showing a shift lock mechanism of a shift lever device relating to a fourth exemplary embodiment of the present invention.

Main portions of a shift lever device 80 serving as a shift device relating to a fourth exemplary embodiment of the present invention are shown in FIG. 9 in a side view seen from the vehicle left.

The shift lever device 80 relating to the present exemplary embodiment has a substantially similar structure as the above-described third exemplary embodiment, but differs with respect to the following points.

As shown in FIG. 9, in the shift lever device 80 relating to the present exemplary embodiment, the link hole 52 is applied to the first link 22 of the shift lock mechanism 20, in the same way as in the above-described second exemplary embodiment.

The second link 30 is supported at the supporting shaft 28 so as to be unable to rotate. The lock surface 32C of the second link 30 is inclined in a direction heading upward while heading toward the vehicle front.

In the same way as in the above-described second exemplary embodiment, the stop projection 24A is formed integrally at the top surface of the stop wall 24. The stop projection 24A projects toward the upper side from the stop wall 24, and is disposed at the vehicle front side of the distal end portion 32B of the second link 30.

Here, in the state in which the shift lever 18 is disposed at the "P" shift position, due to the operation button 62 being operated and the grooved pin 64 being moved toward the lower side of the shift lever 18, at the time when the lock surface 32C of the second link 30 is pushed toward the lower side by the grooved pin 64, in a case in which the magnet 42 is not generating magnetic force and the yoke plate 40 is not attracted to the attraction surface 42A of the magnet 42, in the state in which sliding of the second link 30 toward the vehicle front side against the urging force of the second return spring 38 is impeded, the first link 22, the yoke plate 40 and the second link 30 are slid downward against the urging force of the first return spring 26, and the first link 22 is disposed at the impeding position, and the distal end portion 32B of the second link 30 is stopped at (planarly contacts) the stop wall 24 and the stop projection 24A. Due thereto, sliding of the second link 30 downward and toward the vehicle front side due to the pushing force of the shift lever 18 is stopped by the stop wall 24 and the stop projection 24A, and the lock surface 32C of the second link 30 is not slid toward the lower side and the vehicle front side. Due thereto, movement of the grooved pin 64 toward the shift lever 18 lower side (operation of the operation button 62) is impeded by the lock surface 32C of the second link 30. Therefore, due to the grooved pin 64 engaging the detent mountain 70A between the "P" position and the "R" position of the detent hole 68, operation of the shift lever 18 from the "P" shift position to the "R" shift position is impeded (locked).

On the other hand, in the state in which the shift lever 18 is disposed at the "P" shift position, due to the operation button 62 being operated and the grooved pin 64 being moved toward the lower side of the shift lever 18, at the time when the lock surface 32C of the second link 30 is pushed toward the lower side by the grooved pin 64, in a case in which the magnet 42 generates magnetic force and the yoke plate 40 is attracted to the attraction surface 42A of the magnet 42, in the state in which sliding of the first link 22, the yoke plate 40 and the second link 30 downward against the urging force of the first return spring 26 and the attraction force of the magnet 42 with respect to the yoke plate 40 is impeded, the supporting shaft 28 is slid toward the vehicle front side along the link hole 52 against the urging force of the second return spring 38, and the second link 30 is slid toward the vehicle front side against the urging force of the second return spring 38. Therefore, due to the lock surface 32C of the second link 30 being slid toward the vehicle front side, movement of the grooved pin 64 toward the shift lever 18 lower side (operation of the operation button 62) is permitted. Due thereto, due to the grooved pin 64 not engaging with the detent mountain 70 between the "P" position and the "R" position of the detent hole 68, operation of the shift lever 18 from the "P" shift position to the "R" shift position is permitted (locking released).

Moreover, in a state in which the operation button 62 is operated and the grooved pin 64 is moved toward the lower side of the shift lever 18, after the shift lever 18 is operated from the "R" shift position to the "P" shift position, when operation of the operation button 62 is released and the grooved pin 64 is moved toward the upper side of the shift lever 18, due to the push surface 32D of the second link 30 being pushed toward the upper side by the shift lever 18, the supporting shaft 28 is slid toward the vehicle front side along the link hole 52 against the urging force of the second return spring 38, and the second link 30 is slid toward the vehicle front side against the urging force of the second return spring 38. Therefore, due to the distal end portion 32B of the second link 30 being slid toward the vehicle front side, movement of the grooved pin 64 toward the shift lever 18 upper side is permitted, and movement of the grooved pin 64 toward the "P" position of the detent hole 68 is permitted.

Note that, in the present exemplary embodiment as well, operation and effects that are similar to those of the above-described third exemplary embodiment can be achieved.

Note that the present exemplary embodiment is structured such that the link hole 52 of the first link 22 is disposed parallel to the vehicle front and rear direction, but may be structured such that the link hole 52 of the first link 22 is inclined in a direction heading upward or downward while heading toward the vehicle front. Further, when the link hole 52 of the first link 22 is structured to be inclined in a direction heading downward while heading toward the vehicle front, the lock surface 32C of the second link 30 may be disposed perpendicular to the vehicle up and down direction, or may be inclined in a direction heading downward while heading toward the vehicle front. Moreover, when the link hole 52 of the first link 22 is structured to be inclined in a direction heading upward while heading toward the vehicle front, the push surface 32D of the second link 30 may be disposed perpendicular to the up and down direction, or may be inclined in a direction heading upward while heading toward the vehicle front.

Further, the above-described third exemplary embodiment and fourth exemplary embodiment are structured such that operation of the shift lever 18 from the "P" shift position to the "R" shift position is impeded or permitted by the shift lock mechanism 20 impeding or permitting movement of the grooved pin 64, respectively. However, in the same way as in the above-described first exemplary embodiment and second exemplary embodiment, operation of the shift lever 18 from the "P" shift position to the "R" shift position may be impeded or permitted by the shift lock mechanism 20 impeding or permitting movement of the shift lever 18, respectively.

Fifth Exemplary Embodiment

Figure 10:
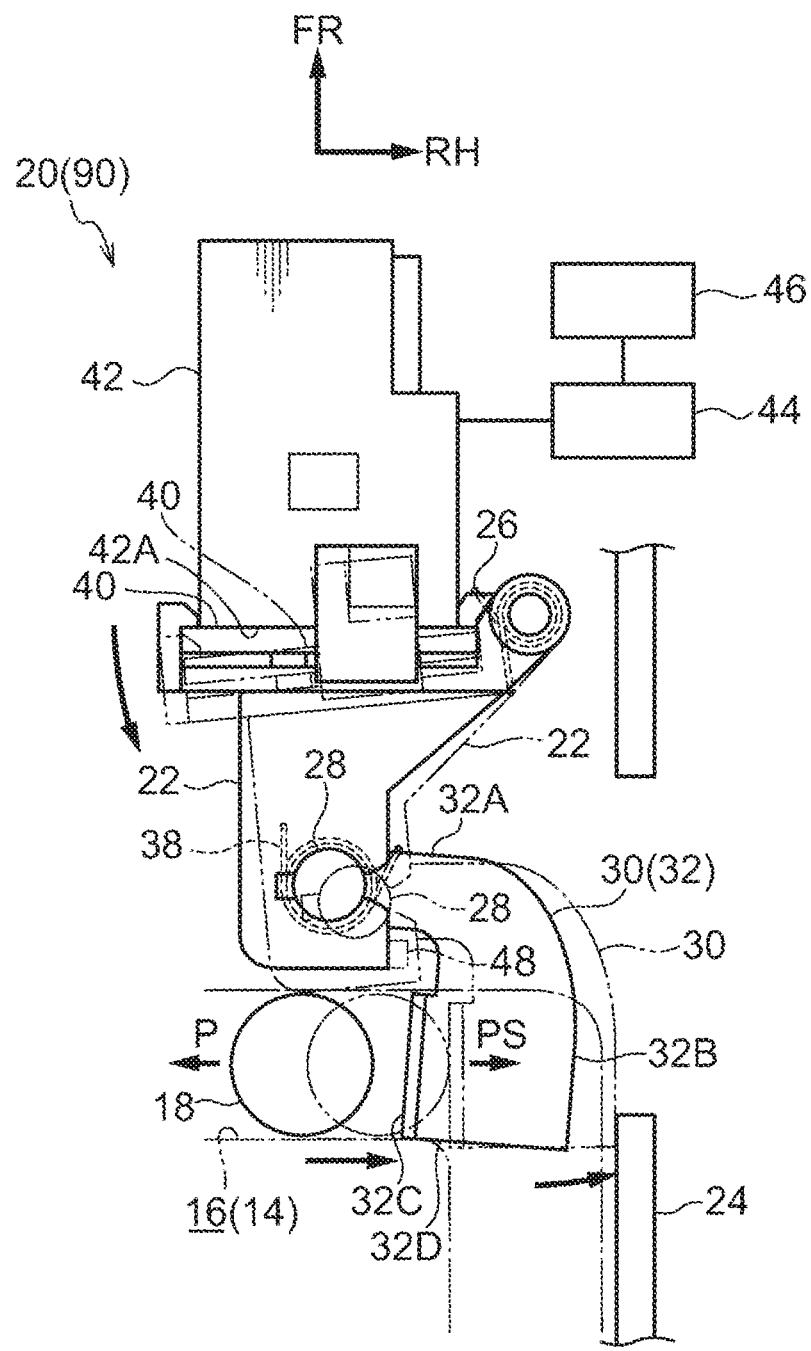
FIG. 10 is a plan view, seen from above, showing the time of shift locking at a shift lock mechanism of a shift lever device relating to a fifth exemplary embodiment of the present invention.

A shift lever device 90, that serves as a shift device relating to a fifth exemplary embodiment of the present invention, is shown in FIG. 10 in a plan view seen from above.

The shift lever device 90 relating to the present exemplary embodiment has a substantially similar structure as the above-described first exemplary embodiment, but differs with respect to the following points.

As shown in FIG. 10, in the shift lever device 90 relating to the present exemplary embodiment, the first link 22 is rotatably supported at the end portion thereof at the vehicle front side and the vehicle right side at the shift lock mechanism 20. The first link 22 is rotatable in the vehicle left and right direction between a permitting position (the locking releasing position shown by the solid lines in FIG. 10) that is the initial position, and an impeding position (the locking position shown by the two-dot chain lines in FIG. 10).

The first return spring 26 is provided at the axis of rotation of the first link 22. The first return spring 26 is a torsion coil spring, and urges the first link 22 toward the vehicle left side.

The yoke plate 40 is held at the vehicle front side surface of the first link 22. The yoke plate 40 is rotatable integrally with the first link 22.

The magnet 42 is fixed at the vehicle front side of the yoke plate 40. The attraction surface 42A is provided at the vehicle rear side surface of the magnet 42. The yoke plate 40 is made to planarly contact the attraction surface 42A due to the urging force of the first return spring 26, and due thereto, the first link 22 is stopped (disposed) at the permitting position that is the initial position. Further, due to the first link 22 and the yoke plate 40 being rotated toward the vehicle right side against the urging force of the first return spring 26, the yoke plate 40 can be separated from the magnet 42 (the attraction surface 42A).

The supporting shaft 28 of the first link 22 projects downward from the first link 22. Further, the accommodating box 36 is not provided at the first link 22, and the moving rods 34A, 34B are not provided at the second link 30.

The second return spring 38 is provided at the supporting shaft 28 of the first link 22. The second return spring 38 is a torsion coil spring, and spans between the first link 22 and the second link 30. The second return spring 38 urges the second link 30 toward the vehicle left side, and rotation of the second link 30 is stopped (restricted) at the first link 22, and the second link 30 is disposed at the initial position.

The vehicle rear side surface of the distal end portion 32B of the second link 30 (the link main body 32) is the push surface 32D, and the push surface 32D is disposed substantially perpendicular to the vehicle front and rear direction. At the time when the shift lever 18 is operated from the "R" shift position and reaches the "PS" position, the push surface 32D of the second link 30 is pushed toward the vehicle front side by the shift lever 18.

The stop wall 24 (plate) is fixed at the vehicle right side of the vehicle rear side end portion of the second link 30, and the vehicle left side surface of the stop wall 24 is disposed perpendicular to the vehicle left and right direction. Further, the stop wall 24 is not disposed at the vehicle right side of the portion, other than the vehicle rear side end portion, of the second link 30.

In the state in which the brake 46 is not operated, due to the magnet 42 not being energized due to control of the control device 44, magnetic force is not generated at the attraction surface 42A, and the yoke plate 40 is not attracted to the attraction surface 42A. Due thereto, due to rotation of the yoke plate 40 and the first link 22 toward the vehicle right side (impeding direction) being permitted, the first link 22 is able to rotate from the permitting position to the impeding position, and is set in the impeding state (locking state).

On the other hand, in the state in which the brake 46 is operated, due to the magnet 42 being energized due to control of the control device 44, magnetic force is generated at the attraction surface 42A, and the yoke plate 40 is attracted to (held at) the attraction surface 42A. Due thereto, due to rotation of the yoke plate 40 and the first link 22 toward the vehicle right side being impeded by the magnet 42, the first link 22 is held at the permitting position, and is set in the permitting state (locking releasing state).

The lower end portion (other end portion) of the release button 48 is disposed at the upper side, at the vehicle right side of the vehicle rear side end of the first link 22. Therefore, due to the upper end of the release button 48 being pushed and operated toward the lower side (the housing 12 interior) against the urging force of the return spring, the lower end portion of the release button 48 is disposed at the vehicle right side of the vehicle rear side end of the first link 22. Due thereto, the first link 22 is stopped (caught) at the lower end portion of the release button 48, and rotation of the yoke plate 40 and the first link 22 toward the vehicle right side is impeded, and the first link 22 is thereby held at the permitting position and is set in a forcibly permitting state (state of forcibly releasing locking).

Here, at the time when the shift lever 18 is operated from the "P" shift position and reaches the "PS" position, in a case in which the magnet 42 is not generating magnetic force and the yoke plate 40 is not attracted to the attraction surface 42A of the magnet 42, as shown by the two-dot chain lines in FIG. 10, in the state in which rotation of the second link 30 with respect to the first link 22 against the urging force of the second return spring 38 is impeded, the first link 22, the yoke plate 40 and the second link 30 are rotated toward the vehicle right side against the urging force of the first return spring 26, the first link 22 is disposed at the impeding position, and the second link 30 is stopped at the stop wall 24. Due thereto, rotation of the second link 30 due to the pushing force of the shift lever 18 is stopped by the stop wall 24, and the lock surface 32C of the second link 30 is not rotated toward the vehicle right side and the vehicle front side. Due thereto, operation of the shift lever 18 to the "PS" position is impeded by the lock surface 32C of the second link 30, and operation of the shift lever 18 from the "P" shift position to the "R" shift position is impeded.

Figure 11:
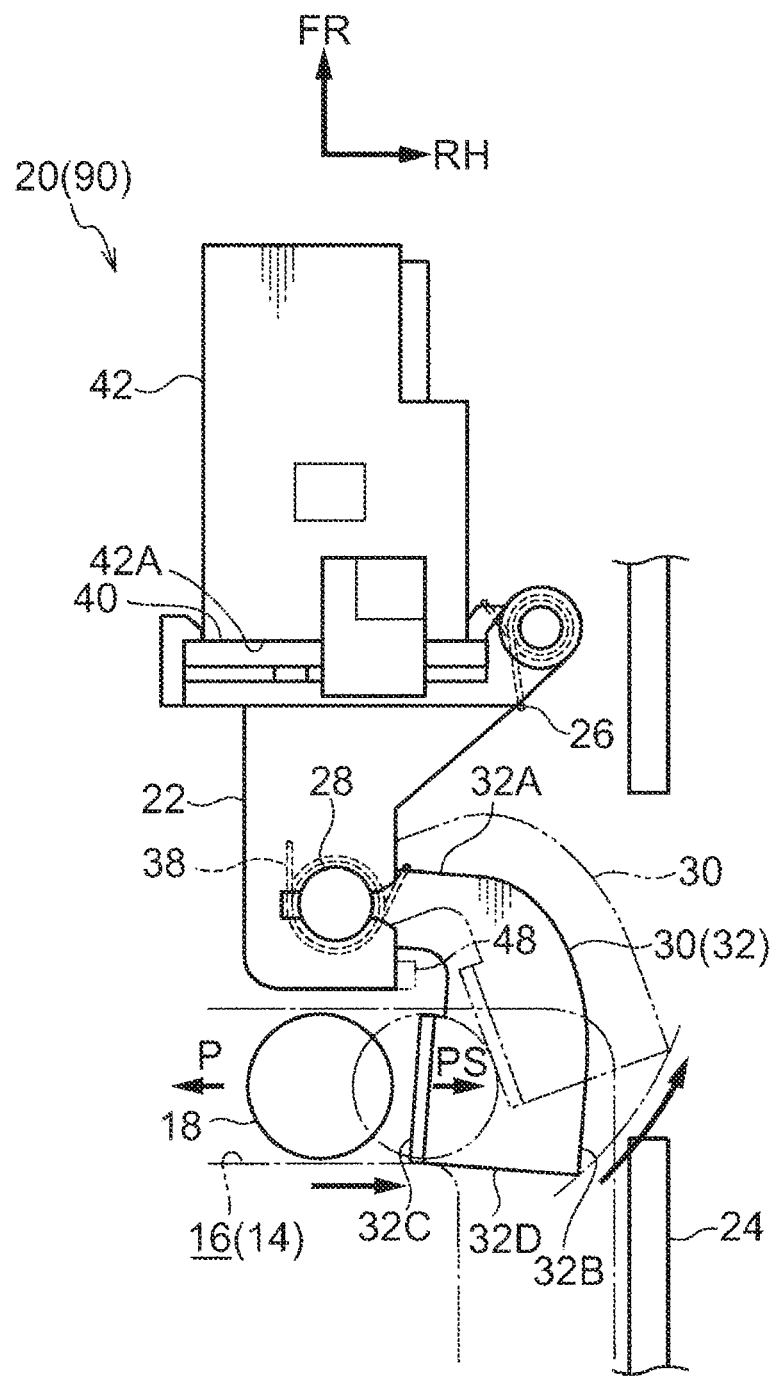
FIG. 11 is a plan view, seen from above, showing the time of shift locking release at the shift lock mechanism of the shift lever device relating to the fifth exemplary embodiment of the present invention.

On the other hand, at the time when the shift lever 18 is operated from the "P" shift position and reaches the "PS" position, in a case in which the magnet 42 is generating magnetic force and the yoke plate 40 is attracted to the attraction surface 42A of the magnet 42, as shown by the two-dot chain lines in FIG. 11, in the state in which rotation of the first link 22, the yoke plate 40 and the second link 30 toward the vehicle right side against the urging force of the first return spring 26 and the attraction force of the magnet 42 with respect to the yoke plate 40 is impeded (the state in which the first link 22 is disposed at the permitting position), the second link 30 is rotated against the urging force of the second return spring 38, and the second link 30 is not stopped at the stop wall 24. Due thereto, due to the lock surface 32C of the second link 30 being rotated toward the vehicle right side and the vehicle front side, operation of the shift lever 18 to the "PS" position is permitted, and operation of the shift lever 18 from the "P" shift position to the "R" shift position is permitted.

Figure 12:
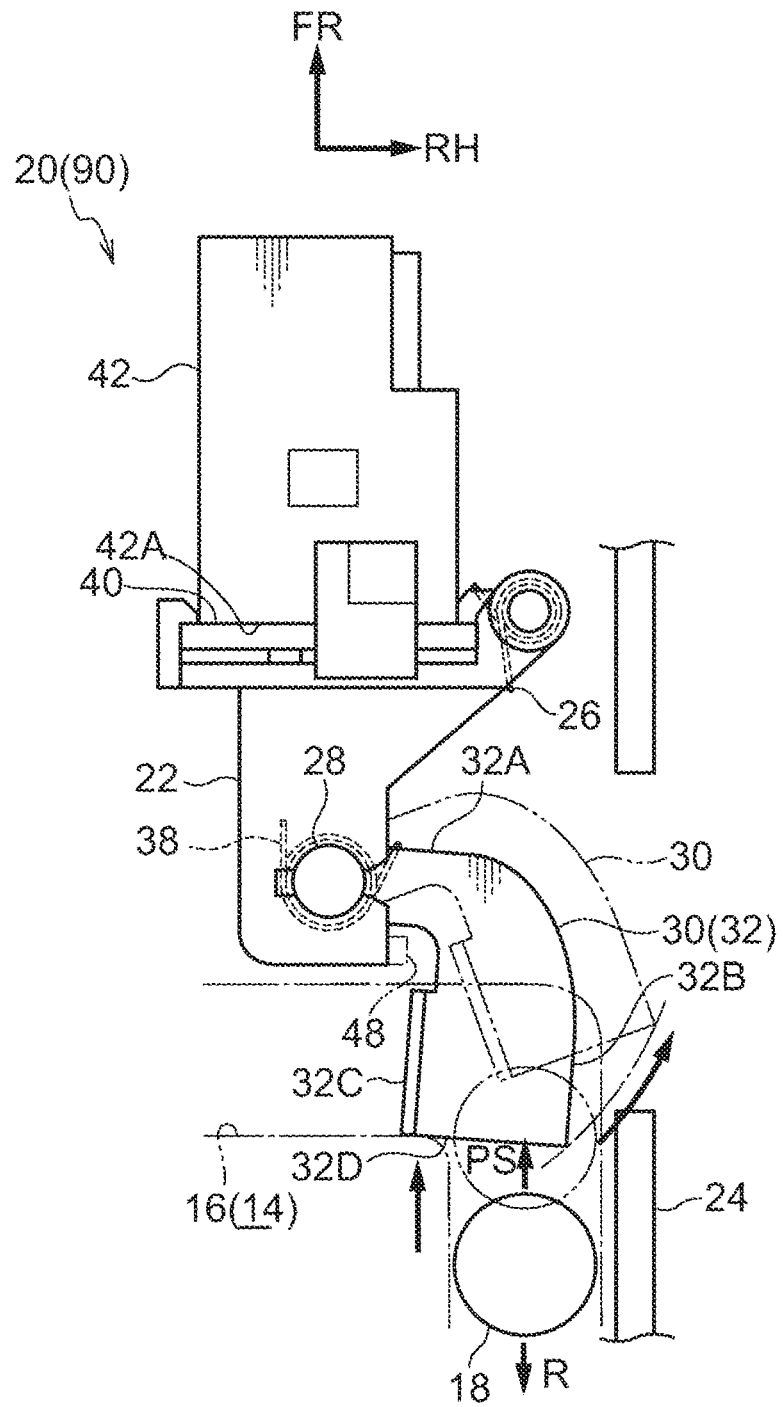
FIG. 12 is a plan view, seen from above, showing the time of operation of a shift lever toward a "P" shift position at the shift lock mechanism of the shift lever device relating to the fifth exemplary embodiment of the present invention.

Moreover, at the time when the shift lever 18 is operated from the "R" shift position and reaches the "PS" position, as shown by the two-dot chain lines in FIG. 12, due to the push surface 32D of the second link 30 being pushed toward the vehicle front side by the shift lever 18, in the state in which rotating force toward the vehicle left side is applied to the first link 22 from the second link 30 and the first link 22 is not rotated (the state in which the first link 22 is disposed at the permitting position), the second link 30 is rotated against the urging force of the second return spring 38, and the second link 30 is not stopped on the stop wall 24. Due thereto, due to the distal end portion 32B of the second link 30 being rotated toward the vehicle right side and the vehicle front side, operation of the shift lever 18 to the "PS" position is permitted, and operation of the shift lever 18 from the "R" shift position to the "P" shift position is permitted.

Further, due to the upper end of the release button 48 being pushed and operated toward the lower side against the urging force of the return spring, the lower end portion of the release button 48 is disposed at the vehicle right side of the vehicle rear side end of the first link 22. Due thereto, due to the first link 22 being stopped at the lower end portion of the release button 48, rotation of the yoke plate 40 and the first link 22 toward the vehicle right side is impeded, and the first link 22 is held at the permitting position.

Therefore, at the time when the shift lever 18 is operated from the "P" shift position and reaches the "PS" position, when the lock surface 32C of the second link 30 is pushed toward the vehicle right side by the shift lever 18, even if the magnet 42 is not energized (even if the yoke plate 40 is not attracted to the attraction surface 42A of the magnet 42), as shown by the two-dot chain lines in FIG. 11, the second link 30 is rotated against the urging force of the second return spring 38 in the state in which rotation of the first link 22 and the yoke plate 40 toward the vehicle right side is impeded. Due thereto, due to the lock surface 32C of the second link 30 being rotated toward the vehicle right side and the vehicle front side, operation of the shift lever 18 to the "PS" position is permitted, and operation of the shift lever 18 from the "P" shift position to the "R" shift position is forcibly permitted (locking released forcibly).

As described above, the present exemplary embodiment as well can achieve operation and effects that are similar to those of the above-described first exemplary embodiment.

Note that the present exemplary embodiment is structured such that the shift lock mechanism 20 is applied to the gate-type shift lever device 90, but may be structured such that the shift lock mechanism 20 is applied to the straight-type shift lever devices 60, 80 in the above-described third exemplary embodiment and fourth exemplary embodiment.

In this case, it is preferable that the lock surface 32C of the second link 30 is disposed so as to face the beneath of the "P" position of the detent hole 68, and, in the state in which the operation button 62 is operated and the grooved pin 64 is moved toward the lower side of the shift lever 18, at the time when the shift lever 18 is operated from the "R" shift position to the "P" shift position, the grooved pin 64 is disposed so as to push the push surface 32D of the second link 30 toward the vehicle front side.

Further, the above-described first exemplary embodiment through fifth exemplary embodiment are structured such that the release button 48 is made to engage with the peripheral surface of the first link 22 and impedes movement of the first link 22. However, there may be a structure in which the release button 48 is made to engage with an engaging hole provided in the first link 22 and impedes movement of the first link 22.

Moreover, in the above-described first exemplary embodiment through fifth exemplary embodiment, the release button 48 is structured by a single part, but the release button 48 may be structured by plural interlocking members that are interlocked with one another. In this case, it suffices to urge at least one of the interlocking members toward the initial position side.

Further, the above-described first exemplary embodiment through fifth exemplary embodiment may be structured such that the distal end portion 32B of the second link 30 is rotatably connected with respect to the proximal end portion 32A side of the second link 30. In this case, due to the distal end portion 32B being urged with respect to the proximal end portion 32A side, rotation of the distal end portion 32B, with respect to the proximal end portion 32A side, toward the opposite side of the "P" shift position side of the operation groove 16, or toward the opposite side of the "P" position side of the detent hole 68, is stopped, and rotation of the distal end portion 32B with respect to the proximal end portion 32A side against urging force toward the "P" shift position side of the operation groove 16, or toward the "P" position side of the detent hole 68, is permitted.

Due thereto, in the state in which rotation of the distal end portion 32B toward the opposite side of the "P" shift position side of the operation groove 16, or toward the opposite side of the "P" position side of the detent hole 68, with respect to the proximal end portion 32A side is stopped, the second link 30 impedes or permits operation of the shift lever 18 from the "P" shift position to the "R" shift position, or movement of the grooved pin 64 from the "P" position of the detent hole 68. On the other hand, due to the distal end portion 32B being rotated toward the "P" shift position side of the operation groove 16, or toward the "P" position side of the detent hole 68, against the urging force and with respect to the proximal end portion 32A side, the second link 30 permits operation of the shift lever 18 from the "R" shift position to the "P" shift position, or movement of the grooved pin 64 to the "P" position of the detent hole 68.

Moreover, in the above-described first exemplary embodiment through fifth exemplary embodiment, the shift lever devices 10, 50, 60, 80, 90 are structured as floor-type devices and are set on the floor portion of the vehicle cabin. However, the shift lever devices 10, 50, 60, 80, 90 may be structures that are set at the steering column of a vehicle, or may be structures that are set at the instrument panel of a vehicle.

What is claimed is:

1. A shift device comprising:
   a shift member whose shift position is changed by the shift member being operated;
   a placed member that is disposed at a permitting position and is moveable to an impeding position, operation of the shift member from a predetermined shift position being permitted due to the placed member being stopped at the permitting position at a time when the shift member is operated from the predetermined shift position, and operation of the shift member from the predetermined shift position being impeded due to the placed member being moved to the impeding position at a time when the shift member is operated from the predetermined shift position; and
   an operation member that stops the placed member being disposed at the permitting position, by the operation member being operated such that the operation member is moved from a position which is apart from the placed member to a position at which the operation member catches the placed member,
   wherein the operation member is moved from the position which is apart from the placed member to the position at which the operation member catches the placed member without the placed member being moved from the permitting position.

2. The shift device of claim 1, further comprising an urging member that urges the placed member to place the placed member at the permitting position.

3. The shift device of claim 1, further comprising a moving member that switches permitting and impeding of operation of the shift member from the predetermined shift position by a motion of the moving member being changed, due to placement of the placed member being switched between the permitting position and the impeding position at a time when the shift member is operated from the predetermined shift position.

4. The shift device of claim 2, further comprising a moving member that switches permitting and impeding of operation of the shift member from the predetermined shift position by a motion of the moving member being changed, due to placement of the placed member being switched between the permitting position and the impeding position at a time when the shift member is operated from the predetermined shift position.

5. The shift device of claim 4, wherein the moving member is provided at the placed member so as to be relatively rotatable or movable respect to the placed member.

6. The shift device of claim 5, wherein
   the moving member is rotatable around an axis at the placed member, and
   operation of the shift member from the predetermined shift position is permitted due to the moving member being rotated around the axis in a state where the placed member is held at the permitting position at a time when the shift member is operated from the predetermined shift position.

7. The shift device of claim 5, wherein
   the moving member is movable along a predetermined direction at the placed member, and
   operation of the shift member from the predetermined shift position is permitted due to the moving member being moved along the predetermined direction in a state where the placed member is held at the permitting position at a time when the shift member is operated from the predetermined shift position.

8. The shift device of claim 6, further comprising a stop portion that stops movement of the moving member,
   wherein operation of the shift member from the predetermined shift position is impeded due to the placed member being moved to the impeding position so that the moving member is caught at the stop portion.

9. The shift device of claim 7, further comprising a stop portion that stops movement of the moving member,
   wherein operation of the shift member from the predetermined shift position is impeded due to the placed member being moved to the impeding position so that the moving member is caught at the stop portion.

10. The shift device of claim 1, wherein the operation member is operated by the operation member being pushed by an occupant.

11. The shift device of claim 1, further comprising a moving member that is provided at the placed member, and that switches between permitting and impeding of operation of the shift member from the predetermined shift position by a motion of the moving member being changed, due to placement of the placed member being switched between the permitting position and the impending position at a time when the shift member is operated from the predetermined shift position is permitted by the moving member being relatively rotated or relatively moved with respect to the placed member which is at the permitting position.

\* \* \* \* \*